United States Patent
Oh

(10) Patent No.: US 9,300,186 B2
(45) Date of Patent: Mar. 29, 2016

(54) ELECTRICALLY POWERED RECIPROCATING MOTOR

(76) Inventor: Choo-Peng Oh, Sabah (MY)

( * ) Notice: Subject to any disclaimer, the term of this patent is extended or adjusted under 35 U.S.C. 154(b) by 44 days.

(21) Appl. No.: 14/238,500

(22) PCT Filed: Aug. 12, 2011

(86) PCT No.: PCT/MY2011/000186
§ 371 (c)(1),
(2), (4) Date: Apr. 16, 2014

(87) PCT Pub. No.: WO2013/025089
PCT Pub. Date: Feb. 21, 2013

(65) Prior Publication Data
US 2014/0225460 A1    Aug. 14, 2014

(51) Int. Cl.
*H02K 7/06*    (2006.01)
*H02K 33/00*   (2006.01)
*H02K 7/075*   (2006.01)

(52) U.S. Cl.
CPC .................. *H02K 7/06* (2013.01); *H02K 7/075* (2013.01); *H02K 33/00* (2013.01)

(58) Field of Classification Search
CPC ........... H02K 7/06; H02K 7/075; H02K 7/10; H02K 7/116; H02K 33/00; H02K 33/16; H02K 41/02; B61C 9/00; B61C 11/00
USPC ........ 310/12, 20, 22, 23, 24, 37, 75 R, 80, 83
See application file for complete search history.

(56) References Cited

U.S. PATENT DOCUMENTS

| | | | | |
|---|---|---|---|---|
| 1,981,827 | A * | 11/1934 | Wolfgang | 60/716 |
| 2,356,869 | A * | 8/1944 | Miller | 451/47 |
| 2,366,072 | A * | 12/1944 | Tucker et al. | 89/37.17 |
| 3,754,154 | A * | 8/1973 | Massie | 310/30 |
| 4,507,579 | A | 3/1985 | Turner | |
| 5,457,349 | A * | 10/1995 | Gifford | 310/24 |
| 5,469,004 | A * | 11/1995 | Jachim | 310/24 |
| 5,747,911 | A * | 5/1998 | Kikly | 310/239 |
| 5,801,462 | A * | 9/1998 | Yagoto et al. | 310/12.19 |
| 6,053,840 | A * | 4/2000 | Jones | 475/338 |
| 6,570,274 | B2 | 5/2003 | Kim et al. | |
| 7,579,722 | B1 * | 8/2009 | Borchert | 310/24 |

(Continued)

FOREIGN PATENT DOCUMENTS

JP    54-76142 A    6/1979

OTHER PUBLICATIONS

Mallick, P. K.. (2010). Materials, Design and Manufacturing for Lightweight Vehicles—3.4 Aluminum Alloys used in Lightweight Automotive Vehicles, Woodhead Publishing. Online version available at: http://app.knovel.com/hotlink/pdf/id:kt0094KO11/materials-design-manufacturing/aluminum-alloys-lightweight.*

(Continued)

*Primary Examiner* — Terrance Kenerly
(74) *Attorney, Agent, or Firm* — Sughrue Mion, PLLC

(57) ABSTRACT

An electric motor to replace conventional electrical motors for general applications comprising at least a propulsion unit (101). The propulsion unit (101) has a propulsion member (11) and a casing (12) having a pair of first guides (13) secured to opposite laterals. It also has a plurality of second guides (14) spaced and disposed along a surface of said casing (12), for receiving and actuating the propulsion member (11).

35 Claims, 6 Drawing Sheets

(56) References Cited

U.S. PATENT DOCUMENTS

| | | | |
|---|---|---|---|
| 2002/0043879 A1* | 4/2002 | Joong et al. | 310/12 |
| 2006/0186749 A1* | 8/2006 | Strydom | 310/103 |
| 2008/0042496 A1* | 2/2008 | Chiou | 310/15 |

OTHER PUBLICATIONS

Hughes, Austin. (2006). Electric Motors and Drives—Fundamentals, Types and Applications (3rd Edition)—1.3.3 The Air-Gap. Elsevier. Online version available at: http://app.knovel.com/hotlink/pdf/id:kt008BVN43/electric-motors-drives/the-air-gap.*

* cited by examiner

US 9,300,186 B2

ELECTRICALLY POWERED RECIPROCATING MOTOR

CROSS REFERENCE TO RELATED APPLICATIONS

This application is a National Stage of International Application No. PCT/MY2011/000186 filed Aug. 12, 2011, the contents of all of which are incorporated herein by reference in their entirety.

TECHNICAL FIELD

The present invention relates to an electric motor, more particularly to an electric motor for general applications.

BACKGROUND OF INVENTION

Prior arts have employed the use of electric motor for various applications in industries such as transportation, manufacturing, construction, and in every other industry employing the similar use.

Electric motor in the prior arts, specifically electro-magnetically driven devices have been expensive, heavyweight, complex, and easily fatigued. There are also prior arts where the conventional reciprocating internal combustion engines employed as the electric motor. U.S. Pat. No. 5,276,372 unveiled electric motors having rotors eccentrically driven by linearly reciprocating members that are powered by superconducting electromagnets, and in particular to those in which the electromagnets are solenoids that are cooled cryogenically.

U.S. Pat. No. 7,579,722 B1 unveiled an electric engine having a torque bearing crankshaft that rotates in 90 degree increments to align and fire the pistons ninety degree apart where only one piston fires at a time and uses the energy from the next piston fired to return to its resting position. U.S. Pat. No. 4,317,058 unveiled an electro-magnetic reciprocating engine and method for converting an internal combustion engine to an electro-magnetic reciprocating engine wherein the cylinders are replaced with non-ferromagnetic material and pistons reciprocally disposed therein are replaced with permanent magnet pistons.

These prior art disclosures fail to address the issues of cost, portability, and efficiency of their power transmission units. The inventor is henceforth determined to address these problems with the present invention of a driven device for power transmission, wherein the device is simplistically structured and allows for an efficient, lightweight and an effective electrically powered reciprocating motor for various applications.

SUMMARY OF INVENTION

The object of the present invention is to provide electrically powered reciprocating motor that is electro-magnetically driven, wherein the device mainly comprises a propulsion unit and a means for supplying current to the propulsion unit operating on the principles of an electric motor.

It is an object of the present invention to provide a propulsion unit characterised by having a propulsion member. The propulsion member herein is preferably provided with a magnetic element, an insulator or a combination thereof, so that the propulsion member can be made of mainly insulating elements that greatly supports in heat reduction. The propulsion member also reciprocates.

Another object of the present invention is to provide the same propulsion unit characterised by a casing for receiving and actuating the propulsion member having a pair of first guides that are magnetic secured to the opposite laterals, and a plurality of second guides that are conductors disposed along the surface of said casing, operating on the teachings of electro-magnetism, thereby establishing the principles of an electric motor operation.

It is yet another object of the present invention to provide at least a driving plate engaging with the propulsion member for transmitting power, and at least a power output rod positioned around the driving plate parallel to the rotational axis of the driving plate.

Henceforth, the present invention intends to realize an environmentally friendly electrically powered reciprocating motor that is electro-magnetically driven for power transmission of a device or a system that requires a mechanical source of energy input.

DETAILED DESCRIPTION OF EMBODIMENTS

Described below are preferred embodiments of the present invention with reference to the accompanying drawings. Each of the following preferred embodiments describes an example not limiting in any aspect.

Figure 1:
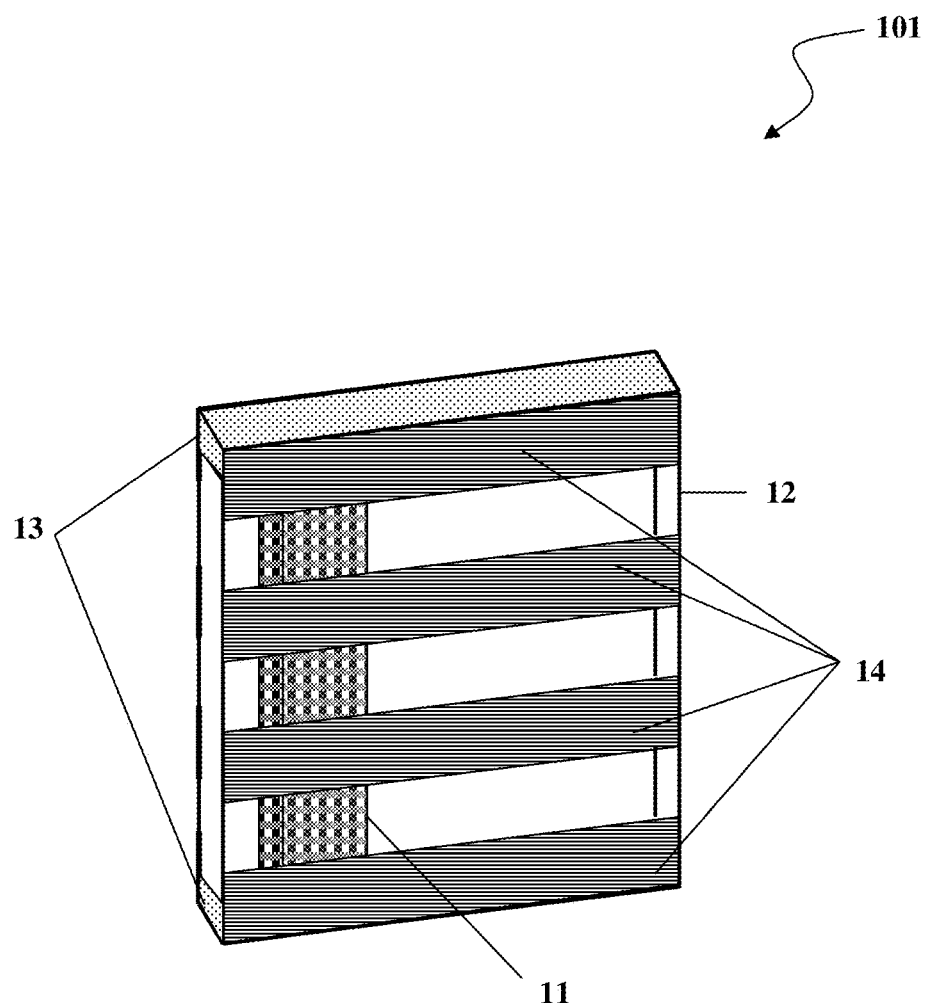
FIG. 1 illustrates a perspective view of the propulsion unit in accordance with the present invention.

Referring to FIG. 1, the figure illustrates a perspective view of the propulsion unit (101) in accordance with the present invention, whereby the propulsion unit (101) can be constituted with a single propulsion unit (101) or a multiple of this unit.

The propulsion unit (101) in accordance with the present invention essentially comprises a propulsion member (11), and is electrically powered for providing linear reciprocating movement of the propulsion member (11). The present invention further comprises a casing (12), a pair of first guides (13), a plurality of second guides (14), and a means for supplying current to the propulsion unit (101).

For actuating said propulsion member (11), the propulsion member (11) is well received into a casing (12) having the pair of first guides (13) secured to the opposite laterals, and the plurality of second guides (14) disposed along the surface of said casing (12). The power source from the means for supplying current to the propulsion unit (101) can be any source of power that supplies electrical energy to move the propulsion member (11) in accordance with the present invention, including power sources such as batteries, fuel cells, generators, alternators, or solar powered cells.

By way of an example, the figure shows the propulsion unit (101) having four strips of second guides (14) enveloping the anterior surface of the casing (12), preferably parallel to each other. However, the propulsion unit (101) preferably functions with at least a pair of second guides (14), whereby one of the embodiments of the pair of the second guide (14) is enveloped on each of the anterior and the posterior surface.

Then, the pair of first guides (13) with a predetermined magnetic field direction to accommodate the operation of the present invention, positioned at the base and the top of the casing (12). The pair of first guides (13) can also be energized in an embodiment to provide levitation to the propulsion member (11), wherein the propulsion member (11) and the pair of first guides (13) are magnetized with the same polarity to create an opposing force, so that friction between the propulsion member (11) and the propulsion unit (101) is minimized to the minimal during the operation of the present invention.

However, the choice for lubricating the pair of first guides (13) and the propulsion member (11) to minimize friction during the operation of the present invention shall be also preferred when the pair of first guides (13) is not magnetic. In the same context, the pair of first guides (13) are replaced with any solids and lubricated without any provision of electricity to the pair of first guides (13).

The casing (12) hereof is preferably made of cost effective and lightweight materials such as carbon fiber, glass fiber, plastic, aluminum foams, or any other suitable composite materials that facilitates the make of the present invention. Said casing (12) is shown to be of a slim rectangular box that well receives the propulsion member (11), and could be designed and constructed in any appropriate form for the operation of the present invention.

The propulsion member (11) herein is preferably provided with magnetic elements, whereby the magnetic elements of the propulsion member (11) engage with the second guides (14) that are conductive, thereby providing propagating force to the propulsion member (11). Similarly, the propulsion member (11) can be made of any suitable composite materials, but preserving the magnetic parts for engaging with the plurality of second guides (14).

The present invention can employ the use of insulators or any suitable materials in the propulsion member (11) and the casing (12) herein that is lightweight for the operation of the present invention, thereby accounting for a device that provides efficient source of mechanical or kinetic energy with minimal power loss since the present invention requires minimum energy to provide force when lightweight materials are used.

The propulsion member (11) as preferred in the present invention is a solid oblong block of elements described before, or a H-shaped block of the similar elements for receiving another component into the middle section of the H-shaped block, or any appropriate shapes that could perform the functionalities of the propulsion member (11) disclosed in the present invention.

From the principles of electromagnetism, given the study of Lorentz force, an electromagnetic force can be harnessed from the provision of a magnetic force and an electric force.

It is therefore that the present invention implements such that the plurality of second guides (14) that are conductive when supplied with an electric field i.e. current, shall allow the propulsion member (11) with magnetic elements to electro-magnetically propel in a linear motion. The pair of first guides (13) that are magnetic allows for a smoother propagation.

The plurality of the second guides (14) that are conductive, effectively a coil and the propulsion member (11) with magnetic elements, and the support acquired from the pair of first guides (13) that are magnetic, in accordance with the present invention, typically forms a linear motor, whereby the propulsion member (11) propagates with a force that is linearly proportional to the current and the magnetic field.

It should be also noted that the electro-magnetically propelled propulsion member (11) is reversible, hence instituting linear reciprocating movement of the propulsion member (11) when the propulsion member (11) propels back and forth.

Figure 2:
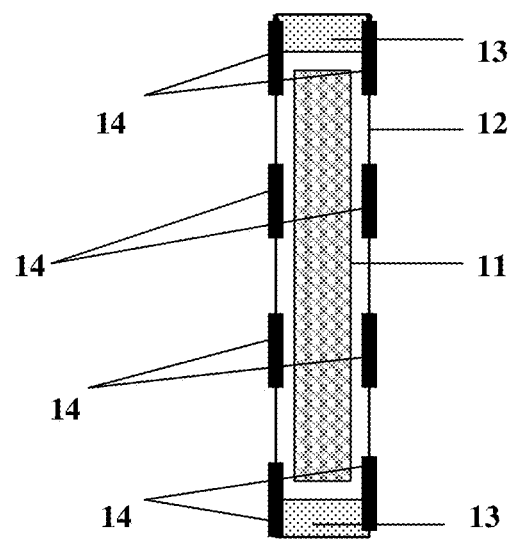
FIG. 2 illustrates a narrow cross sectional view of the propulsion unit in accordance with the present invention.

Referring now to FIG. 2, there is shown a narrow cross sectional view of the propulsion unit (101) in accordance with the present invention, where the propulsion member (11) is positioned at the mid point of the casing (12), and whereby the casing (12) is roofed and bottomed with a pair of first guides (13) that are magnetic.

The narrow cross sectional view further shows a vertical left and a vertical right edge of the casing (12) having segments of parallel second guides (14), which are preferably enveloping the posterior and the anterior surfaces of the propulsion unit (101) respectively as seen in FIG. 1. The number of segments of the parallel second guides (14) manipulatively depends on the required power output of the propulsion member (11), and the conductive surface area of the second guides (14) are usually increased for providing greater electromagnetic force to propel the propulsion member (11).

As mentioned previously, the present invention operates on the basis of the principles of electromagnetism, such that the present invention provides a linear motor to propel the propulsion member (11).

As such, when the propulsion unit (101) is energized by a power source, said propulsion member (11) shall be suspended inside the casing with the assisting pair of first guides (13), hence experiencing pseudo-levitation. This is shown by the two stationary gaps formed between the propulsion member (11) and the pair of first guides (13) in FIG. 2.

Figure 3:
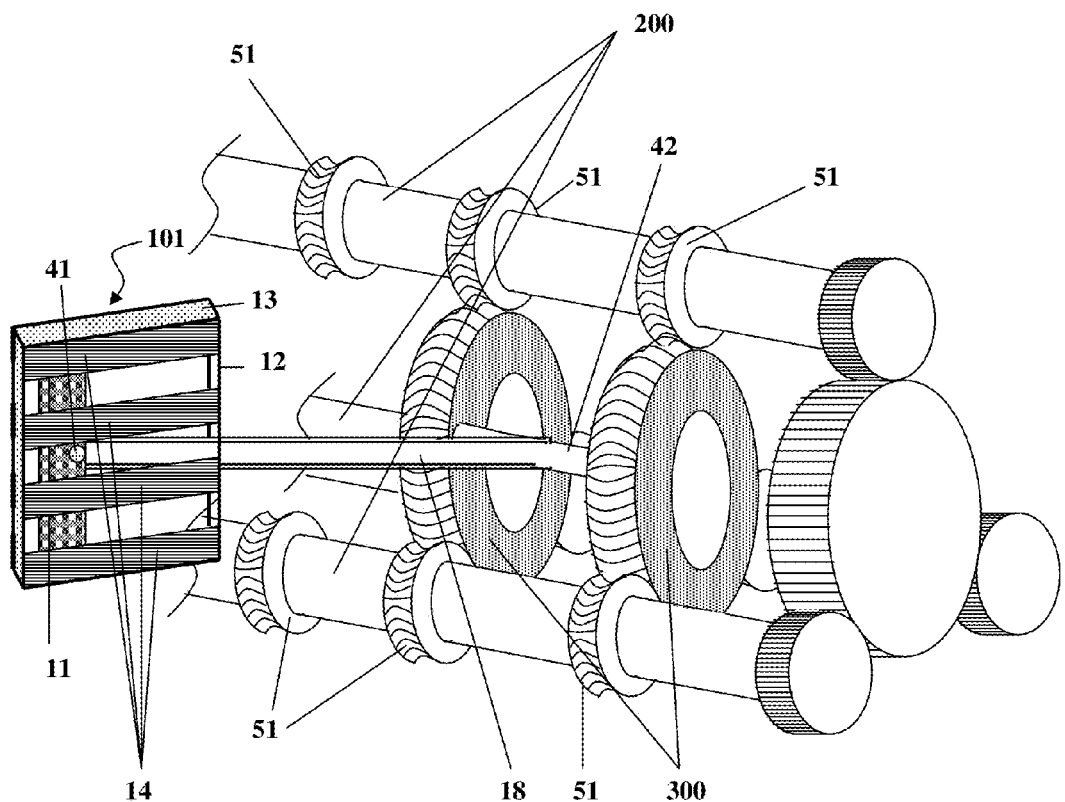
FIG. 3 illustrates a perspective view of the propulsion unit engaging with the driving plate in accordance with the present invention.

Referring to FIG. 3, there is illustrated a perspective view of the propulsion unit (101) engaging with a pair of driving plates (300) in accordance with the present invention for transmitting power.

The figure further depicts a stationary propulsion member (11), whereby once the propulsion member (11) shown is energized, the propulsion member (11) shall be propelled in a linear motion, and the motion shall be subsequently converted to rotational motion of the pair of driving plates (300) through a connecting means (18).

The connecting means (18) is implemented to permit swinging, whereby the end of the connecting means (18) that connects to the propulsion member (11) is pivoted with a first pin (41), and the other end of the connecting means (18) that connects to the pair of driving plates is pivoted with a second pin (42) that is sandwiched near the periphery of the pair of driving plates (300) with a distance from the axis of rotation which holds the pair of driving plates (300) together.

Since the first and second pins (41, 42) of the connecting means (18) allow for swinging, the conversion from the linear reciprocating movement of the propulsion member (11) to the rotational movement of the pair of driving plates (300) is thereby facilitated.

Further, in a preferred embodiment, the present invention is provided with at least a power output rod (200) positioned around the driving plate (300) parallel to the axis rotation of the driving plate (300). There should be a minimum of the three output rods (200) for stability, positioned at equal angles apart in a circular manner.

The driving plate (300) is effectively a gear or a round disc with cogs all round at its edge, very much resembling a sprocket, which are to be meshed onto a corresponding gear (51) on the power output rod (200).

Depending on a preferred embodiment, the edge of the driving plate (300) and the corresponding gear (51) on the power output rod (200) can be in the form of concave cogs meshed to convex gears (51) on the power output rods (200), or convex cogs meshed to concave gears (51) on the power output rods (200).

The power transmission from the propulsion unit (101) to the pair of driving plates (300) is hereafter explained considering the propulsion member (11) is initiated from a distance of the propulsion member (11) that is the greatest from the pair of driving plates (300), and indicating such position of said propulsion member (11) as the starting reference point.

The propulsion unit (101) as preferred in the present invention shall be initially powered with an electrical power source to energize and linearly propel the propulsion member (11) forward, whereby pushing the connecting means (18) also forward.

The end of the connecting means (18) that connects to the second pin (42), which is positioned at a certain distance from the axis of rotation of the pair of driving plates (300), provides acceleration to the pair of driving plates (300). The driving plates (300) shall experience rotational movement due to the force from the linear movement of the connecting means (18) being transferred to the rotational force of the pair of driving plates (300).

The present invention suggests that when the propulsion member (11) reaches the end of the forward propelled journey, the present invention, in one embodiment facilitates the propulsion member (11) to return to the starting reference point through switching the polarity of the supplied current, thus pulling back the connecting means (18) and dragging the end of the connecting means (18) connected to the second pin (42) along the curved path.

The propulsion member (11) then reciprocates, where the whole process is repeated from the initial propagation of the propulsion member (11) to the return of the propulsion member (11) to the starting reference point, thereby rotating the pair of driving plates (300) continuously.

The driving plates (300) which in turn meshes and drives the gears (51) on the power output rods (200). The power output rods (200) then transmit the turning force to drive any auxiliary systems to perform a designated function. The power output rod (200) that drives an auxiliary system, wherein the auxiliary system comprises a device, or a system for any applications that requires a mechanical source of energy input, or a combination, such as not limited to vehicles, ships, and any application by a conventional electric motor.

Preferably, the power output rods (200) can be connected to a flywheel that stores kinetic energy and smoothes the operation of the propulsion unit (101) by maintaining a constant speed of rotation over the whole cycle.

The speed of the rotating pair of driving plates (300) is controlled with a provision of means for controlling the speed, and power output of the propulsion unit (101), preferably a controller connected to the propulsion unit (101) or any suitable means that receives input or automatically programmed for controlling the output power of the propulsion unit (101).

In a preferred embodiment of the present invention, the second guides (14) are to be designed in such a way that it shall stop whenever the power source is cut off and shall continue the working cycle whenever the power source is resumed.

Figure 4:
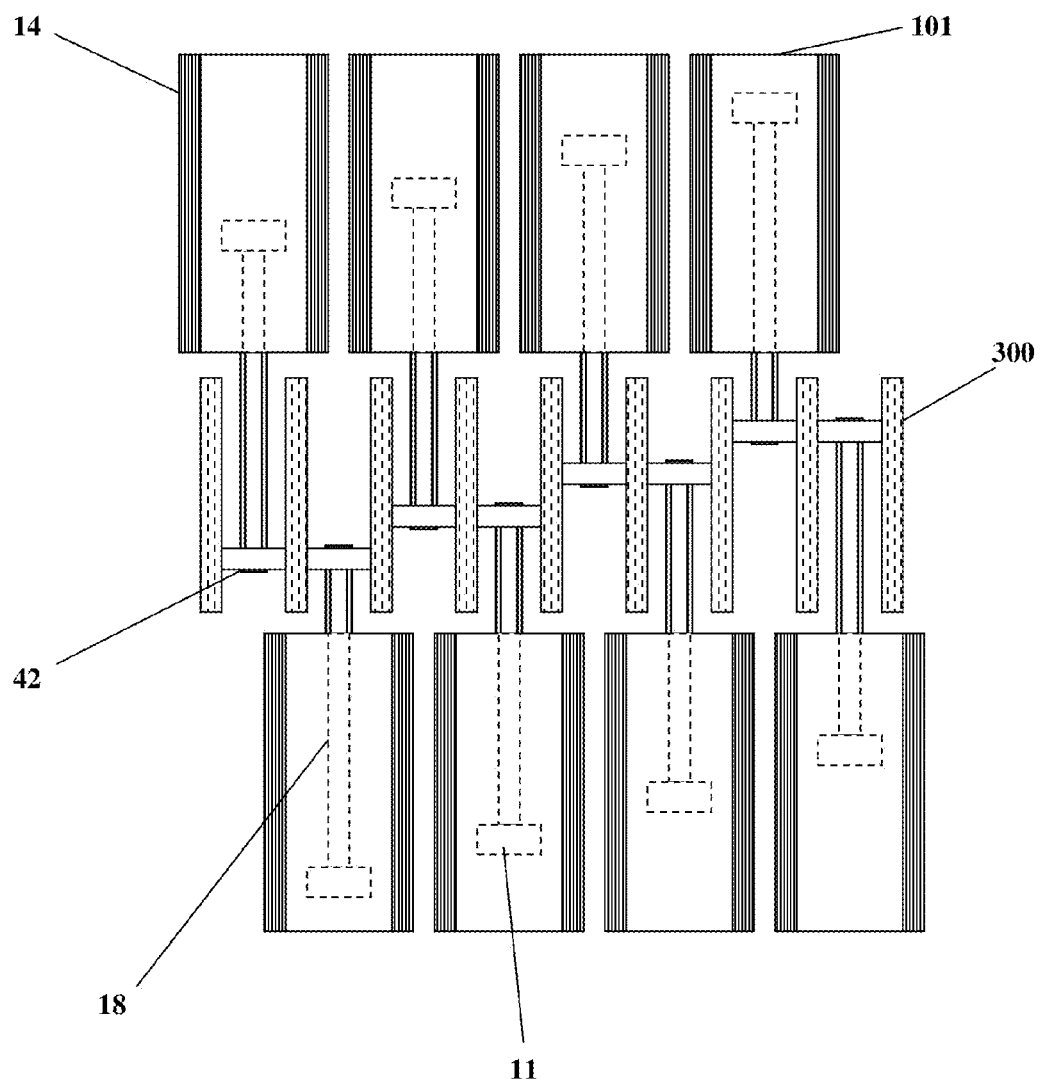
FIG. 4 illustrates a top view of the driving unit having more than one propulsion unit in a preferred embodiment in accordance with the present invention.

Referring now to FIG. 4, there is illustrated the present invention with an implementation of a couple effect of two pairs of propulsion units (101), wherein the direction of each propulsion unit (101) in one pair opposes one another and each connected to a pair of driving plates (300).

In order to synchronize the output of the propulsion units (101), it is compulsory for a pair of propulsion units (101) to share the middle driving plate (300). This means that two propulsion units (101) are to drive only three driving plates (300), three propulsion units (101) are to drive only four driving plates (300), and so on. However, in one example embodiment, a pair of propulsion units (101) placed at opposite position facing each other can also connect to the same second pin (42) to drive the same pair of driving plates (300).

Depending on requirement, the present invention with the implementation of the couple effect, can have as many pairs of propulsion unit (101) as required. If there are 36 pairs of propulsion unit (101), each pair can be programmed to initiate their motion at 10°/360° interval; or for higher torque, every 4 out of 36 pairs can initiate simultaneously at 40°/360° interval. For a full throttling power, every one of the second guides (14) is energized simultaneously.

It is not always the case that the operation of the present invention requires that the second guides (14) to be energized to propel the propulsion member (11). The present invention can be started with an external source of power for providing boost to the propulsion unit (101) where any such application is preferred.

For heavy load applications, the propulsion units (101) of the present invention are engaged with an independent cluster of the propulsion units (101), and preferably disengaged from the independent cluster of the propulsion units (101) when not required. The engaging and disengaging of the propulsion units (101) and the independent cluster of the propulsion units (101) are through an interface, preferably a clutch.

Still referring to FIG. 4, energy is supplied to the second guides (14) only during the outward thrust phase journey. No energy is required for the return journey.

Alternatively, the implementation of the multiple propulsion units (101) in the present invention can be used to drive a conventional crankshaft by connecting the propulsion unit (101) to a corresponding pin on the crankshaft.

Furthermore, the present invention can also be implemented in large ships for thrust moving the ships or docking the ships to the wharfs. Conventionally, a large ship is usually docked with the assistance of several tugboats due to the gargantuan structure of the ship that is difficult for the ship to maneuver over to the dock.

The present invention will be an added advantage because of its greatly reduced scale that would be easy to fit several power transmission units at the bottom of the ship, whereas the conventional motors are large motors to propel and steer the ship.

Figure 5:
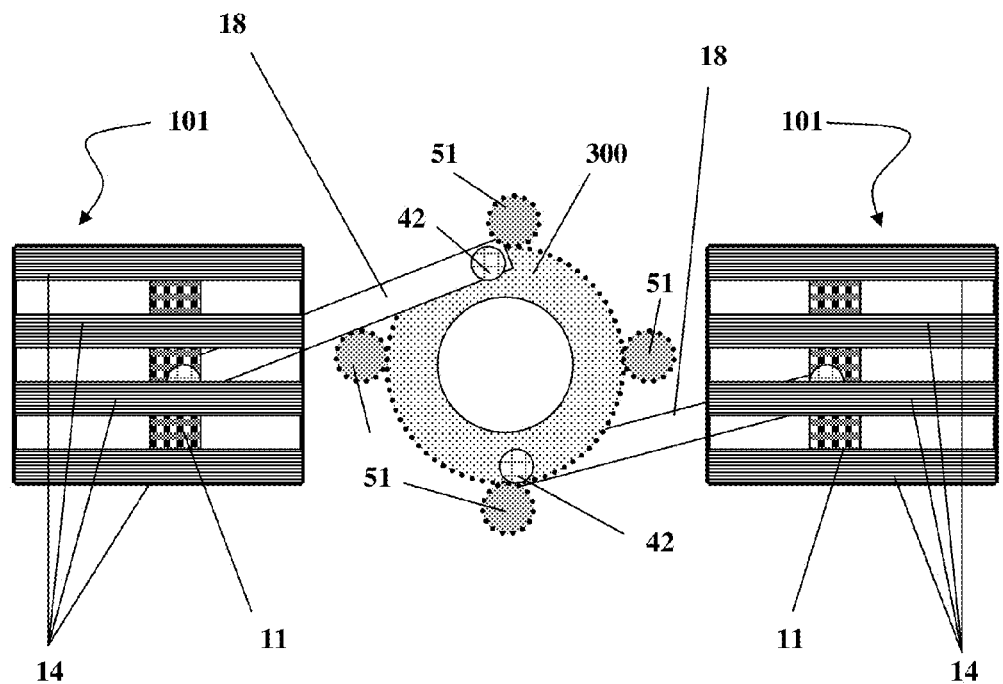
FIG. 5 illustrates an axial view of two opposing propulsion units and the driving plate in a preferred embodiment in accordance with the present invention.

Referring to FIG. 5, the figure illustrates an axial view of two opposing propulsion units (101) and a driving plate (300) in a preferred embodiment in accordance with the present invention. The figure shows the stationary position of the driving plate (300) when each of the opposing propulsion members (11) is at equal lengths from the driving plate (300).

Figure 6:
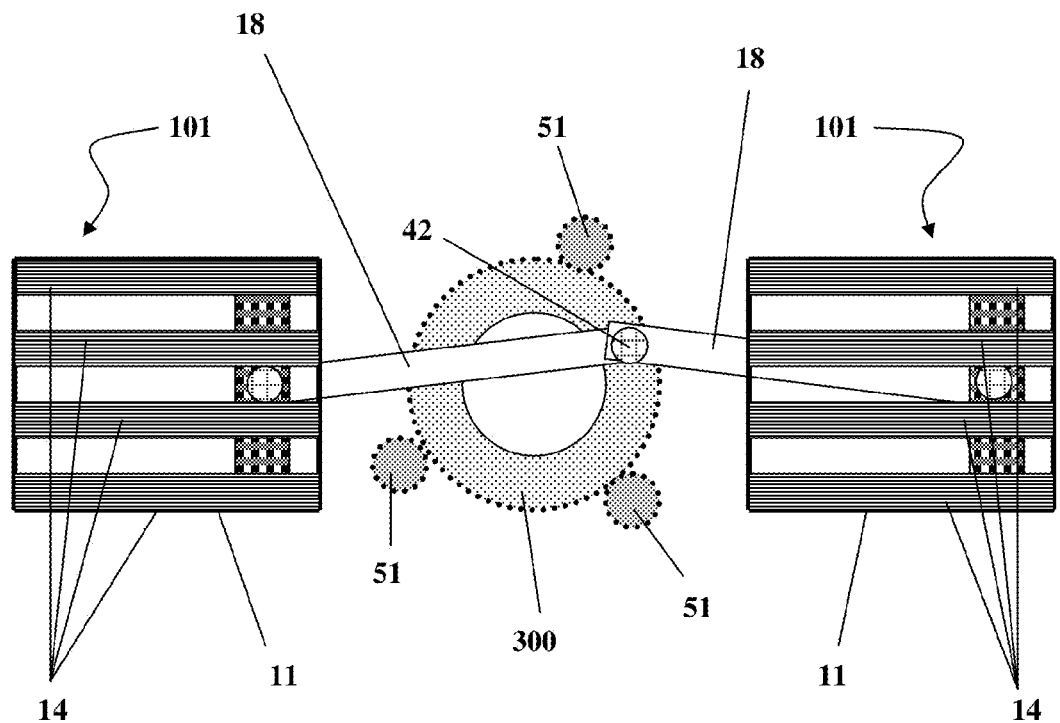
FIG. 6 illustrates an axial view of two opposing propulsion units and the driving plate in a preferred embodiment in accordance with the present invention.

It should be noted that for such an embodiment, the connecting means (18) for each propulsion unit (101) is connected to the opposing surfaces and near the opposing periphery of the driving plate (300) to avoid collision between the connecting means (18). However, in another exemplary embodiment shown in FIG. 6, a pair of propulsion units (101) placed at opposite position facing each other can also connect to the same second pin (42) to drive the driving plate (300) very much like the layout of a boxer machine.

The advantage of the latter embodiment is that when a first propulsion unit (101) propels the propulsion member (11)

forward to rotate the driving plate (300), the second propulsion member (11) returns to its original position, thus the second propulsion member (11) is not required to be propelled in the reverse direction.

The same concept is applied when the second propulsion member (11) is propelled forward to further rotate the driving plate (300), the first propulsion member (11) is pushed back to its original position without applying additional reversible force. The alternating propulsion between the first propulsion unit (101) and the second propulsion unit (101) reduces energy consumption, thereby reducing heat.

However, it is not always the case that the opposing propulsion members (11) are at equal lengths from the driving plate (300). The present invention anticipates for a plurality of connecting means (18) connected at incremental angles on the driving plate (300) so that in a preferred embodiment, each unit in plurality of propulsion units (101) shall require minimal force to power a load since the force to power the load is shared among the propulsion units (101) at each incremental angles.

In as much as the present invention is subject to many variations, modifications and changes in detail, it is intended that all matter contained in the foregoing description or shown in the accompanying drawings shall be interpreted as illustrative and not in a limiting sense.

The invention claimed is:

1. An electrically powered reciprocating motor comprising:
   at least one propulsion unit comprising:
   a casing, said casing having two surfaces each being parallel to a reciprocating direction and further comprising:
      a pair of opposed lateral support structures, said lateral support structures being disposed at opposite ends of said reciprocating direction,
      a pair of first reciprocal movement guides, said first guides being secured to the pair of opposed lateral support structures and being oriented in said reciprocating direction, and
      a plurality of second guides disposed along the two surfaces of said casing so as to envelop an internal volume of the casing and being oriented in said reciprocating direction; and
   a propulsion member received into the internal volume of the casing between the pair of first guides, said propulsion member being coupled with and energized by the plurality of second guides to propel in said reciprocating direction parallel to the pair of first guides provided that the plurality of second guides is supplied with current.

2. An electrically powered reciprocating motor in accordance with claim 1, wherein the propulsion member is provided with a magnetic element, conducting element, nonconducting element or a combination thereof.

3. An electrically powered reciprocating motor in accordance with claim 1, wherein said second guides are conducting elements.

4. An electrically powered reciprocating motor in accordance with claim 1, wherein the propulsion member and the second guides are spaced with a gap.

5. An electrically powered reciprocating motor in accordance with claim 1, wherein the casing is made of carbon fiber, glass fiber, plastic or aluminum foam.

6. An electrically powered reciprocating motor in accordance with claim 1, wherein the pair of first guides are magnetized.

7. An electrically powered reciprocating motor in accordance with claim 1, wherein the plurality of second guides envelop the surface of the casing in parallel to each other.

8. An electrically powered reciprocating motor in accordance with claim 1, wherein said second guides energizes the propulsion member electromagnetic force.

9. An electrically powered reciprocating motor in accordance with claim 1, wherein the speed, and power output of the propulsion unit are controlled.

10. An electrically powered reciprocating motor in accordance with claim 1, wherein gaps are formed between the propulsion member and the pair of first guides.

11. An electrically powered reciprocating motor in accordance with claim 1, wherein the propulsion member of the propulsion unit is propelled by electromagnetic propulsion.

12. An electrically powered reciprocating motor in accordance with claim 1, wherein the propulsion member of the propulsion unit is propelled in a linear motor configuration.

13. An electrically powered reciprocating motor in accordance with claim 1, wherein the propulsion member is propelled in a linear motion.

14. An electrically powered reciprocating motor in accordance with claim 1, wherein the propulsion member reciprocates.

15. An electrically powered reciprocating motor in accordance with claim 1, wherein the propulsion member engages with an external device comprising a driving plate for transmitting power.

16. An electrically powered reciprocating motor in accordance with claim 1, wherein the propulsion member is propelled in a linear motion, and the linear motion of the propulsion member is converted to rotational motion of the driving plate.

17. An electrically powered reciprocating motor in accordance with claim 1, wherein the driving plate is a gear.

18. An electrically powered reciprocating motor in accordance with claim 1, wherein the propulsion member transmits power to the driving plate via a connecting means.

19. An electrically powered reciprocating motor in accordance with claim 1, wherein the connecting means connects the propulsion member and the driving plate with at least two pins.

20. An electrically powered reciprocating motor in accordance with claim 1, wherein the connecting means swings.

21. An electrically powered reciprocating motor in accordance with claim 1, wherein a plurality of the driving plates are provided, and the connecting means is sandwiched between a pair of the driving plates.

22. An electrically powered reciprocating motor in accordance with claim 1, wherein the external device further comprises at least a power output rod positioned around the driving plate parallel to the axis rotation of the driving plate.

23. An electrically powered reciprocating motor in accordance with claim 1, wherein the power output rod has gears that meshes with the driving plate.

24. An electrically powered reciprocating motor in accordance with claim 1, wherein a plurality of power output rods and a plurality of driving plates are provided, and the plurality of power output rods are positioned at equal angles apart in a circular manner around the plurality of driving plates.

25. An electrically powered reciprocating motor in accordance with claim 1, wherein the current supplied to the propulsion unit via any one or in a combination of batteries, fuel cells, generators, alternators, or solar powered cells.

26. An electrically powered reciprocating motor in accordance with claim 1, wherein the current is supplied to the second guides.

27. An electrically powered reciprocating motor in accordance with claim 1, wherein the speed, and power output of the propulsion unit is controlled by a controller.

28. An electrically powered reciprocating motor in accordance with claim 1 wherein at least two units of the propulsion units share at least one of the driving plates.

29. An electrically powered reciprocating motor in accordance with claim 1, wherein at least two units of the propulsion units share at least a pin.

30. An electrically powered reciprocating motor in accordance with claim 1, wherein at least two units of the propulsion units are energized in alternate sequence.

31. An electrically powered reciprocating motor in accordance with claim 1, wherein at least two units of the propulsion units are energized simultaneously for heavy load applications.

32. An electrically powered reciprocating motor in accordance with claim 1, wherein the propulsion units are started with an external source of power.

33. An electrically powered reciprocating motor in accordance with claim 1, wherein the casing is roofed and bottomed with the pair of first guides.

34. An electrically powered reciprocating motor in accordance with claim 1, wherein the surfaces of said casing, along which a plurality of second guides are disposed, are posterior and anterior surfaces of said casing.

35. An electrically powered reciprocating motor in accordance with claim 1, wherein at least a pair of the second guides are provided, and the pair of the second guides respectively envelope anterior and posterior surfaces of said casing.

\* \* \* \* \*